Nov. 21, 1961 C. W. CHILL ET AL 3,009,424
WORK CARRIER TRANSFER DEVICE
Filed July 10, 1959 5 Sheets-Sheet 1

INVENTORS.
Charles W. Chill.
Chester G. Clark.
BY Edward Juszon.

Harness, Dickey & Pierce.
ATTORNEYS.

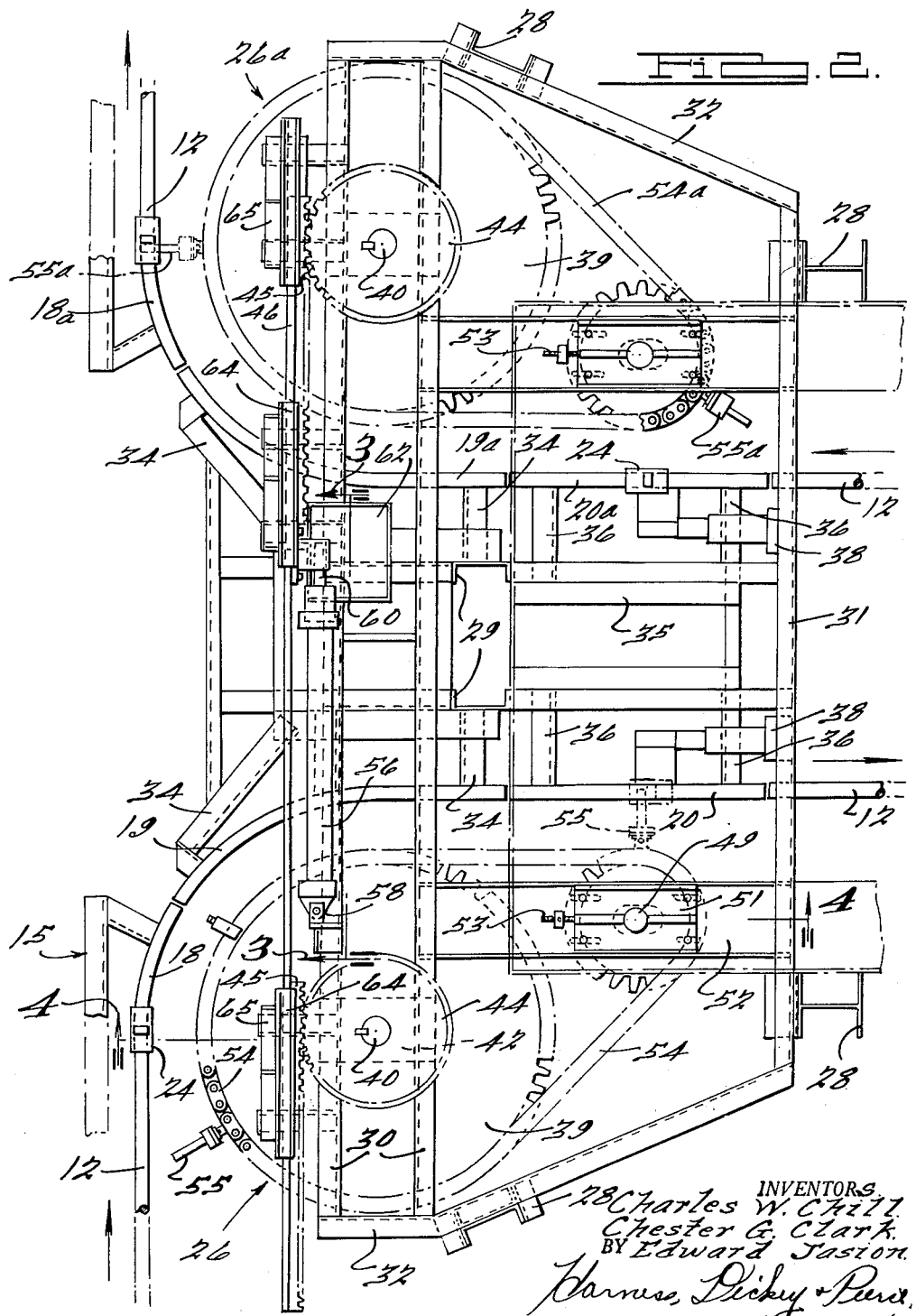

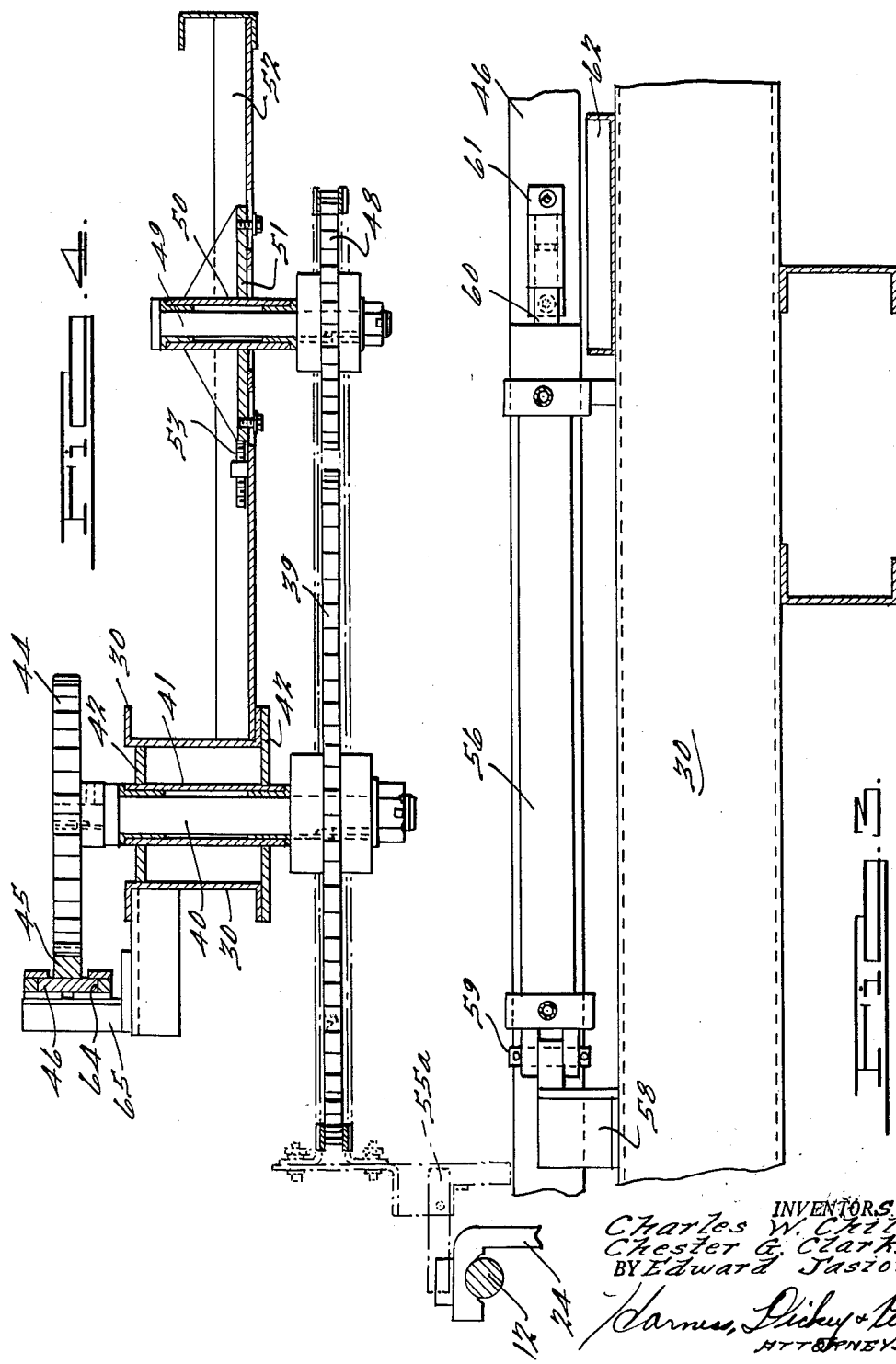

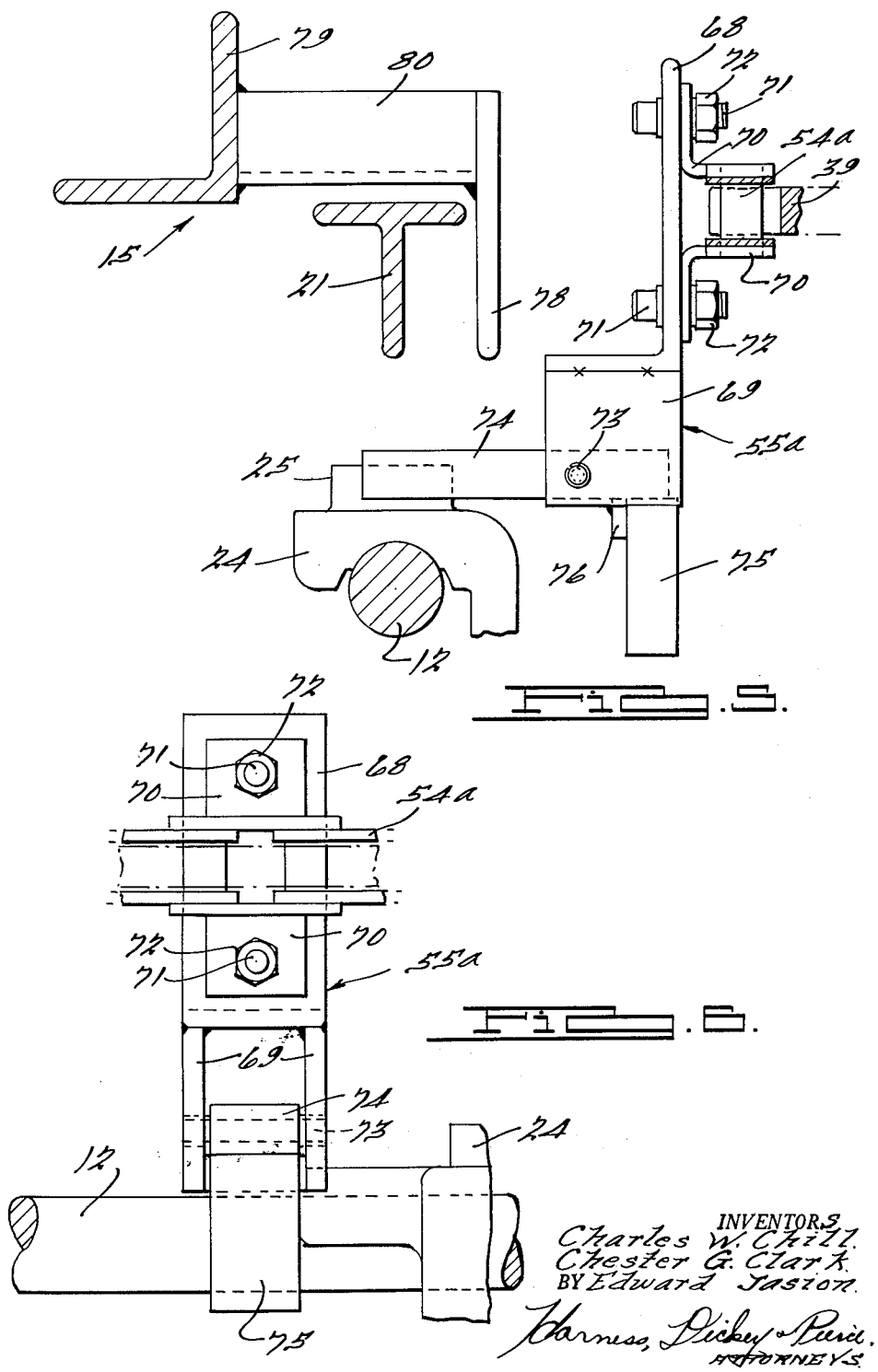

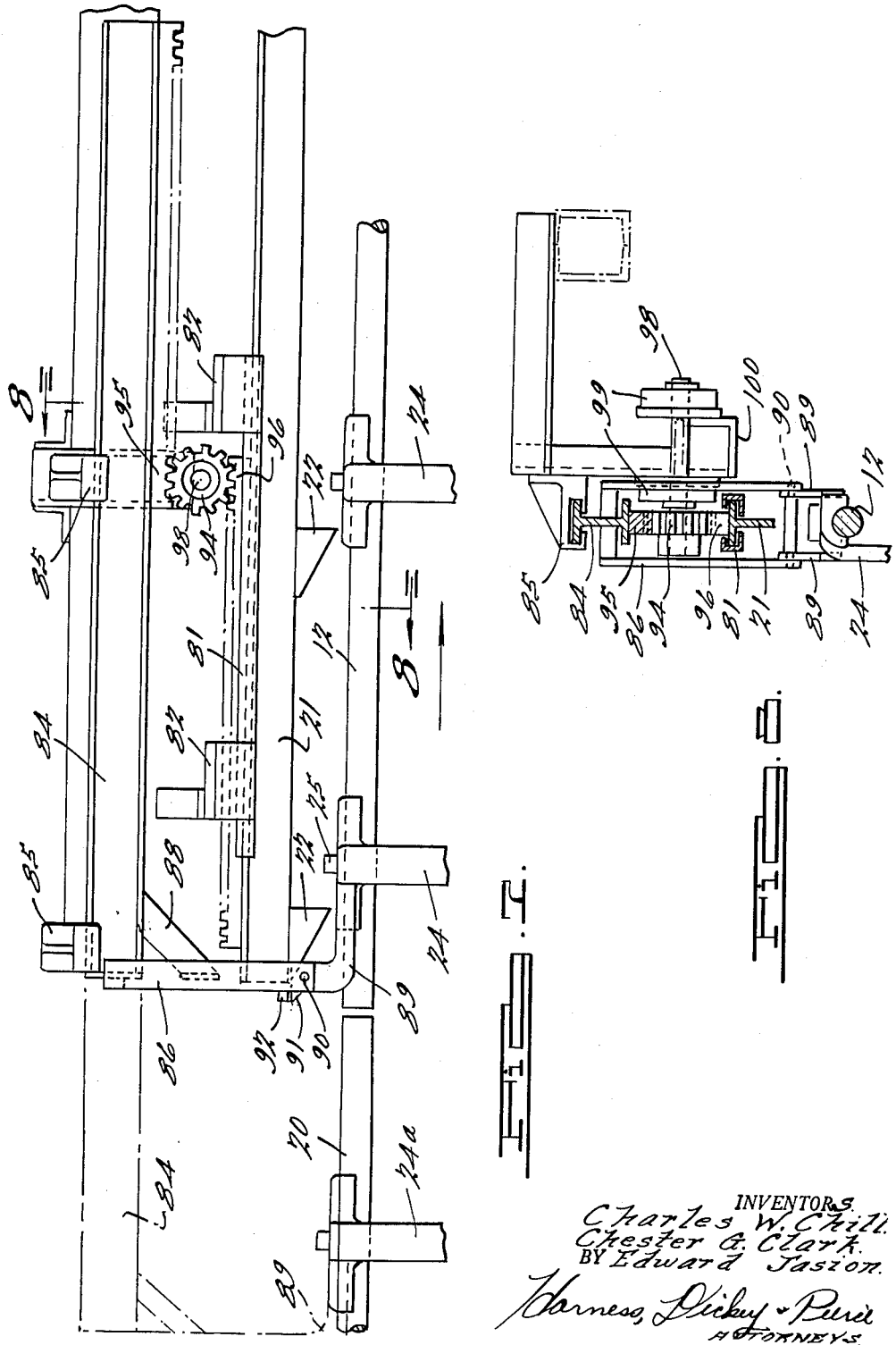

United States Patent Office 3,009,424
Patented Nov. 21, 1961

3,009,424
WORK CARRIER TRANSFER DEVICE
Charles W. Chill, Milford, and Chester G. Clark and Edward Jasion, Detroit, Mich., assignors to The Udylite Corporation, Detroit, Mich., a corporation of Delaware
Filed July 10, 1959, Ser. No. 826,238
17 Claims. (Cl. 104—162)

This invention relates to work carrier transfer mechanisms for conveying apparatus of the general type described in United States Patent Re. 24,072 of October 11, 1955, originally No. 2,650,600 of September 1, 1953, and assigned to the same assignee as the present invention.

In conveying apparatus of the general type described in the aforementioned patent, a plurality of work carriers are movably mounted on a supporting rail and conveyed thereon around a circuit usually having two straight side sections connected at one or both of their ends by an arcuate turn-around section. The work carriers are intermittently advanced along the supporting rails by a reciprocating pusher-type transfer mechanism of the well-known type whereby workpieces suspended from the work carriers pass through a series of treating receptacles disposed below the supporting rails. Sections of the supporting rails are secured to a vertically movable elevator chassis whereby work carriers on said rail sections are periodically lifted in order that the workpieces suspended therefrom may be transferred over the partitions separating adjoining treating receptacles. Variations of the treating cycles and work flow obtainable on these conveying machines can be greatly increased by providing one or more secondary conveying sections or auxiliary treating sections extending angularly from the principal conveying machine whereby work carriers can be diverted from their normal path of travel along the principal machine through an alternate path of travel provided by the auxiliary sections. Incorporation of one or more auxiliary sections with the principal conveying machine requires an intermediate work transfer mechanism functioning in synchronization with the principal work transfer mechanism whereby work carriers are uniformly transferred between the conveying machine and the auxiliary section.

Accordingly, one object of this invention is to provide an intermediate pusher-type transfer mechanism of simple design and durable operation adapted to transfer work carriers between the principal conveying apparatus and an auxiliary section extending angularly therefrom.

Another object of this invention is to provide an intermediate work transfer mechanism the operation of which is simply synchronized with that of the principal and auxiliary work transfer mechanisms.

Still another object of this invention is to provide an intermediate work transfer mechanism having pushers adapted to engage work carriers and advance them along the supporting rail connecting the rails of the conveying machine and auxiliary section and of a design such that mutual interference between said pusher and the elevator chassis of the principal machine is eliminated.

Another object of this invention is to provide a retractable pusher-type transfer mechanism adapted to advance work carriers one station along the supporting rail and when in its retracted position providing unrestricted vertical movement of adjacent supporting rail sections.

Still another object of this invention is to provide a retractable pusher-type transfer mechanism of simple design and construction having its operation mechanically coordinated with the reciprocating movement of the primary transfer mechanism.

Other objects and advantages of the present invention will become apparent from the following detailed description taken in conjunction with the accompanying drawings wherein:

FIGURE 2 is an enlarged fragmentary plan view of the intermediate transfer mechanism shown in FIGURE 1;

FIGURE 3 is a vertical sectional view of a portion of the intermediate transfer mechanism shown in FIGURE 2 and taken along line 3—3 thereof;

FIGURE 4 is a transverse vertical sectional view of the intermediate transfer mechanism shown in FIGURE 2 and taken along line 4—4 thereof;

FIGURE 5 is a fragmentary elevation view of the pusher mounted on the intermediate work transfer mechanism and in engagement with a work carrier on the supporting rail of the principal machine;

FIGURE 6 is a rear elevation view of the intermediate work transfer pusher shown in FIGURE 5;

FIGURE 7 is a fragmentary elevation view of the auxiliary treating section shown in particular the retractable pusher assembly;

Figures 1, 9:
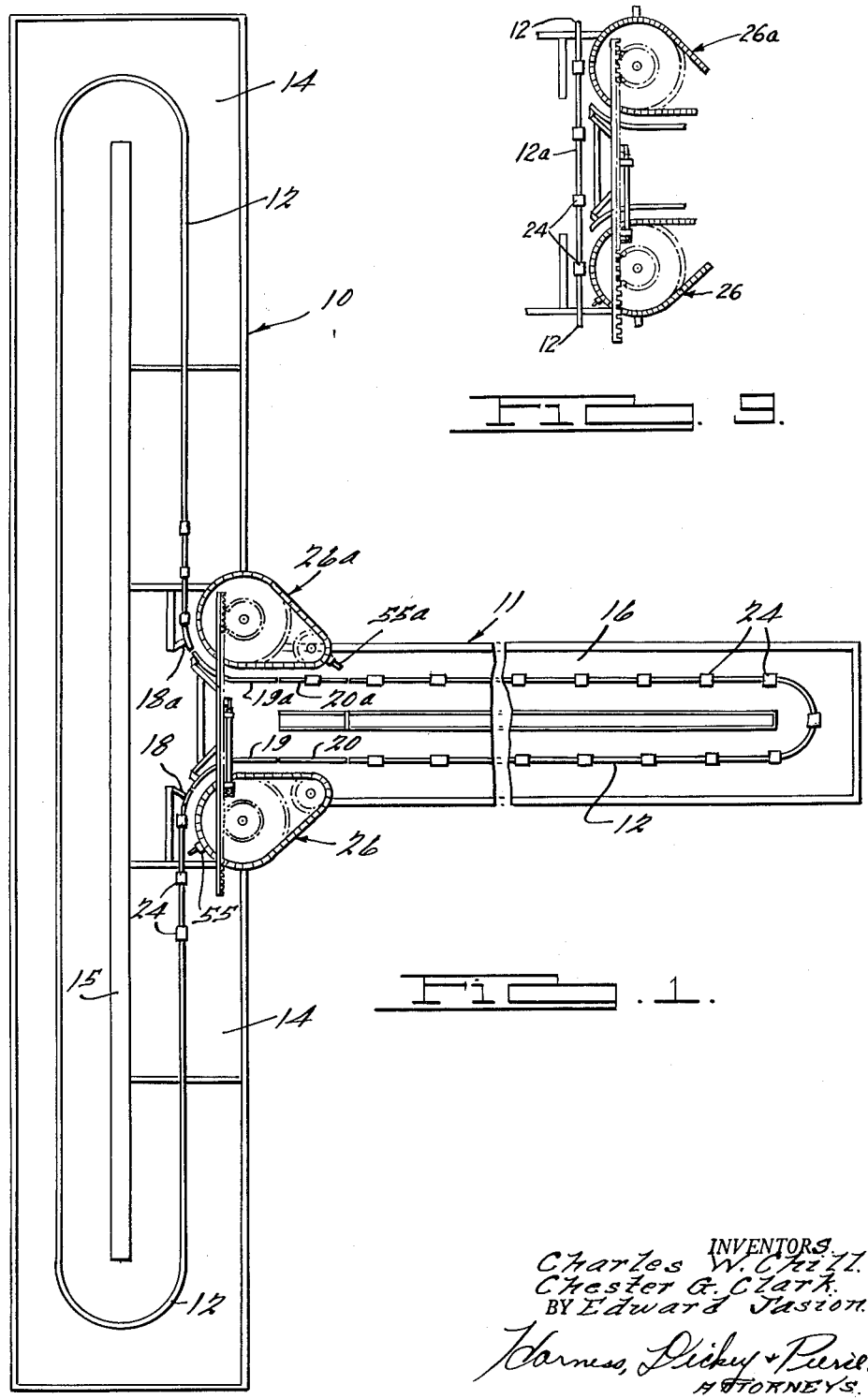
FIGURE 1 is a schematic plan view of a conveying apparatus embodying the present invention and wherein an intermediate transfer mechanism is employed between the principal machine and an auxiliary treating section extending therefrom.

FIGURE 8 is a vertical sectional view of the retractable pusher assembly shown in FIGURE 7 and taken along line 8—8 thereof; and FIGURE 9 is a fragmentary plan view of the conveying machine and intermediate transfer mechanism as shown in FIGURE 1 and illustrating the condition wherein a removable rail section has been inserted on the principal machine providing continuity of the supporting rail whereby the work carriers are restricted to travel along the principal machine and are not diverted to the auxiliary conveying section.

With reference to the drawings and as may be best seen in FIGURE 1, a conveying apparatus embodying this invention is comprised of a principal conveying machine 10 and an auxiliary treating section 11 extending from one of the side sections of the principal conveying machine and at a substantially right angle thereto. The principal conveying machine 10 is of the turn-around type having two substantially straight supporting rails 12 of a circular cross section disposed along the side sections thereof and connected at each of their ends by an arcuate turn-around section. Below the work supporting rail 12 and in alignment therewith are a series of treating receptacles 14 through which workpieces suspended from the supporting rail are sequentially immersed. Sections of the supporting rail 12 are secured to the central elevator chassis 15 whereby workpieces suspended from said rail section are raised and lowered as the elevator chassis is raised and lowered. Auxiliary treating section 11 is of similar construction, having a continuous fixedly mounted supporting rail 12 comprised of two straight side sections connected at their outer ends by an arcuate turn-around section. Disposed below the supporting rail 12 of the auxiliary treating section 11 is a continuous treating receptacle 16 through which workpieces suspended from supporting rail 12 are intermittently advanced. Selected portions of the supporting rail may be electrified by any of the well-known means to provide current to the workpieces on those rail portions as may be required in an electroplating operation. The supporting rail 12 of the principal conveying machine 10 having arcuate terminal rail sections 18, 18a, is connected with the supporting rail 12 of the auxiliary treating section 11 by means of fixedly elevated arcuate rail sections 19, 19a, and vertically movable straight rail sections 20, 20a of the auxiliary treating section 11. Accordingly, alternate alignment of the various supporting rail sections provides a continuous circuit along which the workpieces are intermittently advanced through successive treating sequences.

The workpieces are advanced along the straight supporting rail sections in response to the reciprocating movement of a pusher bar type transfer mechanism, as described in detail in the aforementioned patent. The pusher bars 21 employed in the principal machine 10 and auxiliary treating section 11 are of the type shown in FIGURES 7 and 8 and are disposed above and longitudinally of the work supporting rail 12. Pusher bars 21 are of a T-shaped cross section having pivotally mounted pushers 22 spaced at intervals therealong and adapted to engage projections 25 on the work carriers 24 suspended from the supporting rail. The pushers 22 are constructed to pivot upwardly on being retracted whenever they must travel across a work carrier during the retracting movement of the pusher bars 21. Transfer of the worpieces along the arcuate supporting rail 12 is achieved by rotatably mounted pusher arms linked to the pusher bars as described in detail in Patent Re. 24,072. Reciprocating movement of the pusher bars 21 and pusher arms rotatably mounted in the arcuate turnaround rail portions is achieved by suitable means, not shown, such as a double-acting hydraulic transfer cylinder mounted longitudinally of a pusher bar 21 and connected thereto by a suitable linkage.

As heretofore mentioned, continuity of the work transfer means along the rail sections connecting the principal conveying machine 10 with the auxiliary treating section 11 is achieved by intermediate work transfer mechanisms 26 and 26a disposed adjacent to work supporting rail sections 18, 19 and 20, and 18a, 19a and 20a, respectively. It will, of course, be appreciated by those skilled in the art that the application of the intermediate work transfer mechanism is equally applicable to conveying appparatus of the open-ended type as it is to the turn-around type shown in FIGURE 1. Moreover, the auxiliary treating section may be of a design similar to that of the principal conveying machine 10 having a vertically movable chassis and spaced rail section attached thereto which are raised and lowered as the chassis is raised and lowered. In place of an auxiliary treating section, a secondary conveying section may be utilized for conveying work to and from the principal conveying machine.

It should also be understood that the arcuate terminal rail sections 18, 18a mounted on the elevator chassis 15 of the principal conveying machine are adapted to be removed and replaced with a straight rail section 12a connecting the spaced end sections of supporting rail 12, as shown in FIGURE 9, whereby the path of travel of the workpieces will be restricted to the supporting rail of the principal conveying machine.

The intermediate work transfer mechanism is fixedly supported, as may be best seen in FIGURE 2, on a central framework comprising upright columns 28 and vertical guide channels 29. Transverse channel members 30 and 31 are secured at their ends to side channel members 32 and to which secondary rigidifying elements are attached. Fixedly elevated arcuate rail sections 19, 19a are secured to the central framework by angle brackets 34 and disposed so as to be in alignment with vertically movable arcuate rail sections 18, 18a attached to the principal conveying machine. Vertically movable straight rail sections 20, 20a are secured to lift frame 35 by transverse brackets 36. Lift frame 35 is slidably mounted between vertical guide channels 29 for vertical movement between an elevated position and a lowered position. When rail sections 20, 20a are in the elevated position, they are in alignment with arcuate rail sections 19, 19a, respectively, and when in the lowered position they are in alignment with work supporting rail sections 12 of the auxiliary treating section 11. In treating sequences wherein electrical power is to be transmitted to the workpieces supported on rail sections 20, 20a, such as in an electroplating operation, rail sections 20, 20a may be electrified by means of a sliding shoe contact 38 coacting with a vertical bus bar.

Disposed outwardly of and substantially concentric with arcuate rail sections 18, 18a and 19, 19a are chain drive sprockets 39 rigidly secured to vertical shafts 40 rotatably mounted in bearing sleeves 41, as may be best seen in FIGURE 4. Bearing sleeve 41 extends through cross plates 42 which are securely welded to transverse channels 30. Secured to the upper end of vertical shaft 40 is pinion 44, meshing with racks 45 rigidly secured to slide bar 46. As will be subsequently described in detail, the reciprocating movement of slide bar 46 and gear racks 45 impart a rotary motion to pinions 44, thereby causing sprockets 39 to simultaneously oscillate.

Idler sprocket 48 disposed adjacent to chain drive sprocket 39 and in horizontal alignment therewith is fixedly mounted on vertical shaft 49 rotatably mounted in bearing sleeve 50 secured to plate 51 slidably mounted on cross channel 52. The slidably adjustable feature of idler sprocket 51 provided by adjusting screw 53 enables adjustment of the tension of continuous chains 54 and 54a in engagement with drive sprockets 39 and idler sprockets 48. Pushers 55 and 55a are secured to a link of continuous chain 54 and 54a, respectively, and are effective to transfer work carriers 24 in the direction of the arrows along the arcuate rail sections connecting the principal machine and the auxiliary section. Pushers 55 and 55a are shown in FIGURE 2 in their fully retracted positions and their fully advanced positions are shown in phantom. Accordingly, pusher 55 is effective to transfer a work carrier 24 positioned on supporting rail 12 of the principal conveying machine along arcuate rail sections 18 and 19 to the midpoint of the vertically movable straight rail section 20. Pusher 55a, on the other hand, is effective to transfer a work carrier 24 from the midpoint of vertically movable rail 20a along arcuate rail sections 19a and 18a to a position on work supporting rail 12 of the principal conveying machine. Connecting rail sections 19, 19a may also be fixedly disposed in a lowered position whereby intermediate work transfer mechanisms 26, 26a would be effective in transferring work carriers between the principal machine and auxiliary section when arcuate rail sections 18, 18a and straight rail sections 20, 20a are also in the lowered position and in alignment therewith.

As heretofore mentioned, the motion of pushers 55 and 55a between a retracted and an advanced position is achieved by the coaction of gear racks 45 and pinions 44. Reciprocating movement of slide bar 46 to which gear racks 45 are secured is accomplished by a double-acting hydraulic cylinder 56 disposed longitudinally of the slide bar and pivotally secured at its closed end to transverse channel member 30 by means of upstanding bracket 58 and pin 59. Piston rod 60 of hydraulic cylinder 56 is secured at its outer end to bracket 61 which in turn is rigidly secured to slide bar 46. In this manner, the reciprocating travel of piston rod 60 is imparted to slide bar 46 and gear racks 45. A drip tray 62 is disposed directly below the open end of hydraulic cylinder 56 to catch any hydraulic fluid that may seep from the cylinder. Actuation of hydraulic cylinder 56 is synchronized with the actuation of the principal work transfer cylinder of the conveying mechine 10, such as by concurrently directing pressurized fluid from a common system to each cylinder, providing a uniform transfer of work carriers 24 along the supporting rail. As shown in FIGURE 4, slide bar 46 is slidably mounted in a T slot 64, which is rigidly secured to transverse channel member 30 by L-shaped bracket 65.

Pusher 55a of the intermediate work transfer mechanism 26a is provided with a pusher arm pivotally mounted to enable the elevator chassis 15 of the principal conveying machine 10 to be lowered while the pusher 55a is in the advanced position. As may be best seen in FIGURES 5 and 6, pusher 55a is comprised of a body portion including an L-shaped bracket 68 having rigidly secured to the lower portion thereof vertically depending side members 69 disposed in spaced parallel relationship. Bracket 68 is secured to continuous link chain 54a by angle straps 70 which are secured to the upper portion of bracket 68 by means of bolts 71 and nuts 72. Pivotally mounted on pin 73 extending between the lower portion of vertical side members 69 is pusher arm 74 which extends outwardly therefrom above rail 12 so as to engage projection 25 on work carrier 24. Counterweight 75 is rigidly secured to the lower inner portion of pusher arm 74, imparting a force acting in a clockwise direction as viewed in FIGURE 5. Transverse stop 76 is adapted to engage the forward surface of counterweight 75 and lower surface of pusher arm 74 restricting the downward pivoting travel of the counterweight 75 in a position such that arm 74 is disposed in a substantially horizontal position.

As aforementioned, the pivoting action of pusher arm 74 on pivot pin 73 enables the elevator chassis 15 of the principal conveying machine 10 to be lowered while pusher 55a is in the fully advanced position. Pivoting or tripping of pusher arm 74 when in the advanced position is achieved by trip plate 78 disposed above and in vertical alignment with pusher arm 74, having a rounded lower nose portion adapted to contact the upper portion of pusher arm 74 rotating it downwardly and out of the vertical path of travel of trip plate 78 and the elevator chassis. As shown in FIGURE 5, trip plate 78 is secured to longitudinal angle member 79 of the elevator chassis 15 by means of bracket 80 extending outwardly therefrom above pusher bar 21. As the elevator chassis is lowered, work supporting rail 12 secured thereto having work carrier 24 suspended therefrom moves downwardly to a position such that at the time trip plate 78 strikes pusher arm 74 there is sufficient vertical clearance below the pusher arm to enable its counterclockwise rotation into a vertical position out of the path of travel of pusher bar 21 and trip plate 78.

A similar pivoting feature as described on pusher 55a is not required in the specific machine herein described inasmuch as pusher 55 in its fully retracted position is withdrawn from beneath elevator chassis 15 of the principal conveying machine and in its fully extended position is disposed above vertically movable straight rail section 20 of the auxiliary treating section. Accordingly, pusher 55 may have a pusher arm corresponding to pusher arm 74 that is rigidly secured in the horizontal position. It will, of course, be appreciated that if an elevator chassis were employed on the auxiliary treating section in place of the vertically movable lift frame 35, a pusher similar to pusher 55a would be required actuatable by a trip plate on the auxiliary elevator chassis to enable said chassis to be lowered while said pusher was in the fully advanced position.

Work carriers transferred to the midpoint of vertically movable straight rail section 20 by pusher 55 of intermediate transfer mechanism 26 are advanced from rail section 20 to the next treating station on stationary rail 12 of the auxiliary treating section by a retractable pusher assembly operating in conjunction with the reciprocating pusher transfer mechanism of the auxiliary treating section. The retractable pusher assembly is required to provide vertical clearance and enables vertically movable rail section 20 to be raised and lowered without interference of the auxiliary treating section transfer mechanism. The retractable pusher assembly, as may be best seen in FIGURES 7 and 8, is operative when vertically movable rail section 20 is in the lowered position and in alignment with fixed supporting rail section 12 of the auxiliary treating section. It will be appreciated that the retractable pusher assembly embodied in the specific conveying apparatus herein described is equally applicable to conveying apparatus of the general type having a vertically movable supporting rail section disposed adjacent to a rail section fixedly supported in the lowered position.

The pusher transfer mechanism of the auxiliary treating section is of the well-known type comprising a pusher bar 21 of a T-shaped cross section slidably mounted in shoe 81 secured to the central frame by suitable brackets 82. Shoes 81 are comprised of two U-shaped channels adapted to slidably engage the outer edges of the horizontal flange of pusher bar 21. Pusher bar 21 is disposed above and substantially parallel to work supporting rail 12 whereby pushers 22 pivotally mounted at spaced intervals on the lower portion of the pusher bar are effective in engaging work carriers 24 and advancing them one station along the supporting rail 12.

The retractable pusher assembly is comprised of slide bar 84 having an I-shaped cross section which is slidably mounted in shoes 85 rigidly secured to the central frame. Mounted on the left end of slide bar 84, as viewed in FIGURE 7, is hanger bracket 86 of an inverted U-shaped configuration and reinforced by angular rigidifying element 88. Pivotally mounted at the lower end of hanger bracket 86 are L-shaped pusher arms 89 secured thereto by pivot pin 90. Projection 91 at the upper portion of L-shaped pusher arms 89 is adapted to engage stop block 92 on the hanger bracket 86, restricting the downward pivoting motion of pusher arms 89 in a position wherein pusher arms 89 are disposed horizontally and in alignment with engaging shoulders on the work carriers 24.

Pinion gear 94 disposed between slide bar 84 and pusher bar 21 is adapted to mesh with gear rack 95 secured to the lower side of slide bar 84 and gear rack 96 secured to the upper portion of pusher bar 21. Pinion gear 94 is secured to shaft 98, which is rotatably mounted in bearing blocks 99 which are fixedly secured to longitudinal frame member 100. By means of this rack and pinion arrangement the reciprocating motion of pusher bar 21 is transmitted to slide bar 84 which is caused to reciprocate through the same displacement but in an opposite direction to pusher bar 21. It will be appreciated by those skilled in the art that, for example, by incorporating a second pinion fixedly mounted on shaft 98 adjacent to pinion 94 and meshing exclusively with rack 95, a greater or lesser linear displacement can be imparted to slide bar 84 directly proportional to the ratio of the diameters of said pinions.

The principal work transfer mechanism and retractable pusher assembly is shown in FIGURE 7 in its fully retracted position and wherein the transfer mechanisms are spaced longitudinally from rail section 20 so as to permit unrestricted vertical travel thereof.

The operation of the intermediate work transfer mechanism and retractable transfer assembly will now be described in connection with the specific conveying apparatus herein described. Let it be assumed that the elevator chassis 15 of the principal conveying machine 10 has been raised whereby the arcuate terminal portions 18, 18a of work supporting rail 12 are in alignment with fixedly elevated arcuate rail sections 19, 19a. In addition, lift frame 35 has been elevated to the raised position wherein vertically movable straight rail sections 20, 20a are in alignment with fixedly elevated arcuate rail sections 19 and 19a, respectively. In that position, the work transfer pusher mechanism of the principal conveying machine and the intermediate transfer mechanism are simultaneously actuated by the central control system not shown, whereby work carriers are advanced along the supporting rail 12 of the principal conveying machine and whereby pusher 55 of the intermediate transfer mechanism 26 is caused to engage work carrier 24 on supporting rail 12 of the principal machine and transfer it along arcuate rail sections 18 and 19 to the midpoint of vertically movable straight rail section 20 at the input side of the auxiliary section. Simultaneously, pusher 55a of the intermediate work transfer mechanism 26a is effective in transferring a work carrier from the midpoint of vertically movable rail section 20a along arcuate rail sections 19a and 18a to the entry portion of supporting rail 12 of the principal conveying machine. The elevator chassis 15 of the principal conveying machine is then lowered whereby pusher arm 74 of pusher 55a is tripped downwardly and displaced from beneath the chassis by trip plate 78 to prevent interference therebetween. During the vertical descent of the elevator chassis 15, the work transfer mechanism of the principal conveying machine and the intermediate transfer mechanism are returned to their fully retracted positions preparatory to the next transfer cycle. Lift frame 35 of the auxiliary treating section is then lowered whereby a work carrier on input straight rail section 20 is lowered into the treating receptacle disposed directly below. When the lift frame is in the fully lowered position, vertically movable straight rail sections 20, 20a are in alignment with the ends of supporting rail section 12 of the auxiliary treating section. At the expiration of a controlled time interval, the auxiliary pusher mechanism of the auxiliary treating section is actuated, whereby pusher bars 21 advance work carriers along the supporting rail 12 and whereby a work carrier is transferred therefrom to a position on output vertically movable rail section 20a. As pusher bar 21 moves forward, slide bar 84 of the retractable pusher assembly is caused to move rearward, terminating in the fully extended position, as shown in phantom in FIGURE 7. During the rearward travel of the retractable pusher assembly, pusher arms 89 pivot on coming in contact with work carrier 24a on the movable rail 20 to enable their passage thereover. The pusher transfer mechanism of the auxiliary treating section is then retracted whereby pushers 22 pivot when passing over work carriers 24 on supporting rail 12. Simultaneously, the retractable transfer assembly is caused to travel forward due to the coaction of pinion 98 with gear racks 95 and 96 and whereby work carrier 24a engaged by pusher arms 89 of the retractable pusher assembly is transferred from the midpoint of rail section 20 to the next station on auxiliary supporting rail 12. The lift frame 35 is then raised, carrying with it the work carrier suspended from the midpoint of vertically movable output rail section 20a. At the same time, elevator chassis 15 of the principal conveying machine is raised wherein fixedly elevated rail sections 19, 19a and movable rail sections 18, 18a and 20, 20a are again in alignment preparatory to commencing another transfer cycle.

It will be apparent that the preferred embodiments of the invention herein described are susceptible to modification, variation and change to accommodate one or more auxiliary converying sections of varying types extending angularly from or disposed substantially parallel to the principal conveying machine and interconnected therewith by a connecting rail section. An intermediate transfer mechanism of the general type herein described would be disposed adjacent to each of the connecting rail sections and having at least one pusher means mounted thereon movable longitudinally of the connecting rail and adapted to transfer work carriers therealong. It will be appreciated that these modifications, variations and changes do not deviate from the spirit of this invention nor depart from the proper scope or fair meaning of the subjoined claims.

What is claimed is:

1. A conveying apparatus comprising a conveying machine having an auxiliary conveying section interconnected therewith, a vertically movable chassis on said conveying machine, a first work supporting rail secured to said chassis, a second work supporting rail attached to said auxiliary conveying section, reciprocating pusher means carried by said chassis and said auxiliary section adapted to engage work carriers on said first and said second rails, respectively, a connecting rail section disposed between and aligned with said first and said second rails, intermediate transfer means disposed adjacent to said connecting rail section, pusher means on said transfer means mounted to be movable between a first position adapted to engage a work carrier on said connecting rail section when said transfer means moves said pusher along said connecting rail section and a second position laterally spaced from said first position.

2. A conveying apparatus comprising a conveying machine having an auxiliary conveying section interconnected therewith, a first vertically movable chassis on said conveying machine, a first work supporting rail secured to said first chassis, a second vertically movable chassis on said auxiliary conveying section, a second work supporting rail secured to said second chassis, reciprocating pusher means carried by said first and said second chassis and adapted to engage work carriers on said first and said second rails, respectively, a connecting rail section disposed between and aligned with said first and said second rails, intermediate transfer means disposed adjacent to said connecting rail section, a pusher on at least one of said intermediate transfer means mounted to be movable responsive to means disposed on one of said chassis between a first position adapted to engage a work carrier on said connecting rail when said transfer means moves said pusher along said connecting rail and a second position laterally spaced from said first position.

3. A conveying apparatus as described in claim 2 wherein said intermediate transfer means comprises a plurality of sprockets adapted to rotate in a horizontal plane, a chain extending around said sprockets having a portion thereof disposed longitudinally of said connecting rail section, and means coacting with one of said sprockets adapted to oscillate said chain.

4. A conveying apparatus comprising a conveying machine having an auxiliary conveying section extending angularly therefrom, a vertically movable chassis on said conveying machine, a first work supporting rail secured to said chassis, a second work supporting rail attached to said auxiliary conveying section, reciprocating pusher means carried by said chassis and said auxiliary section adapted to engage work carriers on said first and said second rails respectively, a connecting rail section disposed between and aligned with said first and said second rails, intermediate transfer means disposed adjacent to said connecting rail section, pusher means on said transfer means adapted to transfer a work carrier from a position on said second rail along said connecting rail section to a position on said first rail, said pusher means mounted to be movable responsive to means on said chassis between a first position adapted to engage a work carrier on said connecting rail when said transfer means moves said pusher along said connecting rail and a second position laterally spaced from said first position.

5. A conveying apparatus as described in claim 4 wherein said intermediate transfer means move between a retracted position and an advanced position in synchronization with the advancing stroke of said reciprocating pusher means on said chassis.

6. A conveying apparatus comprising a conveying machine having an auxiliary conveying section extending angularly therefrom, a first work supporting rail attached to said conveying machine, a vertically movable chassis on said auxiliary conveying section, a second work supporting rail secured to said chassis, reciprocating pusher means carried by said conveying machine and said chassis adapted to engage work carriers on said first and said second rails respectively, a connecting rail section disposed between and aligned with said first and said second rails, intermediate transfer means disposed adjacent to said connecting rail section, pusher means on said transfer means adapted to transfer a work carrier from a position on said first rail along said connecting rail section to a position on said second rail, said pusher means mounted to be movable responsive to means on said chasis between a first position adapted to engage a work carrier on said connecting rail when said transfer means moves said pusher along said connecting rail and a second position laterally spaced from said first position.

7. A conveying apparatus as described in claim 6 wherein said intermediate transfer means move between a retracted position and an advanced position in synchronization with the advancing stroke of reciprocating pusher means on said chassis.

8. A conveying apparatus comprising a conveying machine having an auxiliary conveying section extending angularly therefrom, a first vertically movable chassis on said conveying machine, a first work supporting rail secured to said first chassis, a second vertically movable chassis on said auxiliary conveying section, a second work supporting rail secured to said second chassis, reciprocating pusher means carried by said first and said second chassis and adapted to engage work carriers on said first and said second rails respectively, a connecting rail section disposed between and aligned with said first and said second rails, intermediate transfer means disposed adjacent to said connecting rail section, a pusher on said intermediate transfer means adapted to engage and transfer a work carrier along said connecting rail section, said transfer means adapted to move said pusher along said connecting rail between a retracted position and an advanced position in synchronization with the advancing stroke of one of said reciprocating pusher means, said transfer means actuable to partially retract said pusher before one of said rails are moved out of alignment with said connecting rail section.

9. A conveying apparatus comprising a conveying machine having an auxiliary conveying section extending angularly therefrom, a vertically movable chassis on said conveying machine, a first work supporting rail secured to said chassis, a second work supporting rail attached to said auxiliary section having an input end and an output end, reciprocating pusher means carried by said chassis and said auxiliary section adapted to engage work carriers on said first and said second rails respectively, a first rail section connecting said first rail with the input end of said second rail, a second rail section connecting the output end of said second rail with said first rail, intermediate transfer means disposed adjacent to said connecting rail sections, pusher means on said transfer means adapted to transfer work carriers along said connecting rail sections, said pusher means on said intermediate transfer means disposed adjacent to said second rail section movable responsive to actuating means on said chassis between a first position adapted to engage a carrier on said second rail section when said transfer means moves said pusher along said second rail section and a second position laterally spaced therefrom.

10. In a conveying apparatus as described in claim 9 having intermediate transfer means, each of said transfer means comprising a plurality of disks mounted to rotate in a substantially horizontal plane, a flexible element extending around said disks and in engagement with the edges thereof, said disks positioned so that a portion of said flexible element is disposed longitudinally of the length of said connecting rail section, and power means for rotating one of said disks and causing said flexible element to oscillate.

11. In a conveying apparatus as described in claim 9, each of said intermediate transfer means comprising a plurality of sprockets mounted to rotate in a substantially horizontal plane, a chain extending around said sprockets and in engagement therewith, said sprockets positioned so that a portion of said chain is disposed longitudinally of the length of said connecting rail section, a pinion secured to one of said sprockets of each of said intermediate transfer means, a gear rack slidably mounted and in mesh with said pinions, and means for reciprocating said rack whereby said sprockets are rotated and said chassis are simultaneously oscillated between a retracted and an advanced position in synchronization with the advancing stroke of said reciprocating pusher means on said chassis.

12. A conveying apparatus as described in claim 9, said pusher means on said intermediate transfer means adjacent to said second connecting rail section comprising a body member, a pusher arm pivotally mounted on said body member comprising an outwardly extending portion adapted to engage work carriers on said second rail section, an inwardly extending counterweight portion, stop means associated with said pusher arm and restricting the pivoting movement of said arm in said first position, said arm pivotally movable to said second position laterally disposed from said first position by said actuating means on said chassis.

13. A conveying apparatus as described in claim 12 wherein said pusher arm is downwardly pivotable in response to said actuating means on said chassis, said actuating means comprising a trip plate mounted on said chassis above said pusher arm when said arm is disposed longitudinally of said first rail, said trip plate effective to pivot said arm downwardly as said chassis is lowered and out of the vertical path of travel thereof.

14. In a conveying apparatus including a first work supporting rail section, a second vertically movable rail section adapted to fit contiguously at the end and in alignment with said first rail section, reciprocating pusher means adapted to engage work carriers on said first rail section including a pusher bar slidably mounted longitudinally of said first rail section, means for reciprocating said pusher bar, the improvement comprising a retractable pusher mechanism associated with said pusher bar and adapted to transfer a work carrier from said second rail section to said first rail section when said pusher bar is retracted.

15. In a conveying apparatus including a first work supporting rail section, a second vertically movable rail section adapted to fit contiguously at the end and in alignment with said first rail section, reciprocating pusher means adapted to engage work carriers on said first rail section including a pusher bar slidably mounted longitudinally of said first rail section, means for reciprocating said pusher bar, the improvement comprising a retractable pusher mechanism disposed adjacent to said second rail section, said mechanism comprising a pusher adapted to transfer a work carrier from said second rail section to said first rail section, actuating means associated with said pusher bar for reciprocating said pusher between a retracted position spaced longitudinally from said second rail section longitudinally along said second rail section for a distance of at least a portion of the length of said second rail section to an extended position, said reciprocating movement of said pusher being opposite in direction to the reciprocating movement of said pusher bar.

16. In a conveying apparatus including a first work supporting rail section, a second vertically movable rail section adapted to fit contiguously at the end and in alignment with said first rail section, reciprocating pusher means adapted to engage work carriers on said first rail section including a pusher bar slidably mounted longitudinally of said first rail section, means for reciprocating said pusher bar, the improvement comprising a retractable pusher mechanism disposed adjacent to said second rail section, said mechanism comprising a slide bar slidably mounted in spaced parallel relation to said pusher bar, a pusher on said bar adapted to engage a work carrier on said second rail section, a first gear rack on said slide bar, a second gear rack on said pusher bar, a pinion rotatably mounted and fixedly disposed between said first and said second racks, said pinion having diametrically opposite portions of the periphery thereof in mesh with said first and said second racks, respectively, whereby said slide bar and said pusher are reciprocated by said pusher bar and in an opposite direction thereto, and whereby said pusher is moved longitudinally of said second rail section between a retracted position spaced longitudinally from said second rail section to an extended position along said second rail section.

17. In a conveying apparatus including a first work supporting rail section, a second vertically movable rail section adapted to fit contiguously at the end and in alignment with said first rail section, reciprocating pusher means adapted to engage work carriers on said first rail section including a pusher bar slidably mounted longitudinally of said first rail section, means for reciprocating said pusher bar, the improvement comprising a retractable pusher mechanism disposed adjacent to said second rail section, said mechanism comprising a pusher, means associated with said pusher bar for reciprocating said pusher between a retracted position spaced longitudinally from said second rail section longitudinally along said second rail section for a distance of at least a portion of the length of said second rail section to an extended position, said pusher comprising a body member, a bifurcated pusher arm pivotally mounted on said member and movable between a first position adapted to engage a work carrier on said second rail section and a second position disposed laterally from said first position responsive to contact with a work carrier on said second rail section during the extending stroke of said pusher, stop means associated with said pusher arm restricting the pivoting movement of said pusher in said first position, said pusher adapted to transfer a work carrier from said second rail section to said first rail section when said pusher bar is retracted.

References Cited in the file of this patent

UNITED STATES PATENTS

| | | |
|---|---|---|
| 2,451,975 | Rayburn et al. | Oct. 19, 1948 |
| 2,546,374 | Rayburn | Mar. 27, 1951 |
| 2,710,698 | Huck et al. | June 14, 1955 |
| 2,854,159 | Abbey | Sept. 30, 1958 |